United States Patent [19]

Bohrmann et al.

[11] 4,418,090

[45] Nov. 29, 1983

[54] STARCH CONTAINING FOOD PRODUCTS AND PROCESS FOR PREPARING SAME

[75] Inventors: Hans Bohrmann, Talheim; Thomas Campbell, Fein; Werner Grigoteit, Unterheinriet; Günter Müller, Fein, all of Fed. Rep. of Germany

[73] Assignee: CPC International Inc., Englewood Cliffs, N.J.

[21] Appl. No.: 379,676

[22] Filed: May 19, 1982

Related U.S. Application Data

[63] Continuation-in-part of Ser. No. 237,304, Feb. 23, 1981, which is a continuation of Ser. No. 59,415, Jul. 20, 1978, abandoned.

[30] Foreign Application Priority Data

Jul. 31, 1978 [GB] United Kingdom .............. 31695/78

[51] Int. Cl.³ ........................ A23L 1/195; A23L 1/40
[52] U.S. Cl. .................................. 426/578; 426/579; 426/589; 127/32; 127/71
[58] Field of Search ............... 426/589, 578, 579, 557; 127/32, 71

[56] References Cited

U.S. PATENT DOCUMENTS

| | | |
|---|---|---|
| 2,357,585 | 9/1944 | Galvin et al. |
| 2,548,263 | 4/1951 | Tjakr et al. |
| 2,909,431 | 10/1959 | Keller |
| 3,116,151 | 12/1963 | Giddey |
| 3,433,650 | 3/1969 | Block et al. |
| 3,578,497 | 5/1971 | Hjermstad |
| 3,977,897 | 8/1976 | Wurzburg et al. ................. 127/71 |
| 4,013,799 | 3/1977 | Smalligan et al. ................. 426/578 |
| 4,089,988 | 5/1978 | Mostyn et al. .................... 426/578 |

FOREIGN PATENT DOCUMENTS

| | | |
|---|---|---|
| 739632 | 6/1930 | Fed. Rep. of Germany . |
| 725967 | 12/1931 | Fed. Rep. of Germany . |
| 619984 | 9/1935 | Fed. Rep. of Germany . |
| 629798 | 4/1936 | Fed. Rep. of Germany . |
| 2439993 | 3/1976 | Fed. Rep. of Germany . |
| 2455397 | 8/1976 | Fed. Rep. of Germany . |
| 724152 | 10/1931 | France . |
| 1471950 | 3/1966 | France . |
| 2294649 | 12/1974 | France . |
| 1470646 | 4/1977 | United Kingdom . |
| 1479515 | 7/1977 | United Kingdom . |

OTHER PUBLICATIONS

Louis Sair, Methods in Carbohydrate Chemistry, vol. IV, R. J. Whistler, Ed., Academic Press, N.Y., (1964).
Dr. E. Wiegel, ". . . And Previous Thermal History". G. Graefe, Starke, pp. 183–184.
W. F. Vogel, Gemodificeede Zetmelen en hun Toepassing in de voedingsmiddelenindustrie Conserva vol. 18, p. 1, (1969).

*Primary Examiner*—Jeanette M. Hunter

[57] ABSTRACT

A commercially prepared dry food product containing a thickening agent is disclosed. The thickening agent comprises a root starch or a tuber starch having retarded thickening properties. Preparation of the dry food product for ultimate consumption is carried out by adding it directly to boiling aqueous liquid and cooking it therein.

9 Claims, No Drawings

STARCH CONTAINING FOOD PRODUCTS AND PROCESS FOR PREPARING SAME

SUMMARY OF THE INVENTION

This application is a continuation-in-part of our pending United States Patent Application Ser. No. 237,304, filed Feb. 23, 1981, which is a continuation of our United States Patent Application Ser. No. 59,415, filed July 20, 1978, now abandoned, claiming priority of Application No. 31695/78 filed July 31, 1978, in Great Britian.

This invention relates to a novel class of food products which include starch as a thickening agent. More specifically, the invention relates to commercially prepared, dry (i.e., non-aqueous) food products which are prepared for ultimate consumption by adding them directly to boiling aqueous liquids (such as water, milk, boullion, etc.) and cooking them in the boiling liquid, wherein the thickening agent consists of a root starch or tuber starch having retarded thickening properties, preferably a heat-moisture-treated potato starch. In particular, the present invention relates to a dry food product having a thickening component, said food product being prepared for reconstitution by direct addition to boiling aqueous liquid and which comprises in part a thickening component comprising a modified root starch or tuber starch having retarded thickening properties.

BACKGROUND OF THE INVENTION

Various methods have been employed in the prior art in attempts to promote the dispersion of ungelatinized starch directly into hot aqueous liquid. Thus, U.S. Pat. No. 3,433,650 to Block and Touher discloses a dry soup mix utilizing a raw starch such as potato starch as the thickening agent, but the starch receives no heat-moisture treatment. Rather, the reference teaches the coating of individual raw starch particles with fat, such as oleomargarine, vegetable oil, or the like, in order to prevent immediate hydration, and thickening of the starch. Dehydrated ingredients in the soups, such as freeze dried chicken, puffed carrots, etc., are shown in the examples, however, all of these appear to require less than 60 seconds for reconstitution.

U.S. Pat. No. 3,116,151 to Giddey discloses a dispersible powdered ready-for-use food composition. Untreated starch is mixed into a melted fat component, dried and pressed into a cake, which is then grated and mixed with particles of soluble constituents. There is no heat-moisture treatment of the starch.

U.S. Pat. No. 2,357,585 to Galvin and Sternfield discloses a food package. The package is an envelope in which the sticky ingredients of the food composition contained therein, i.e., the fats or oil components, form a plastic mass. This plastic mass is positioned at the center of the dry granular components, which may be noodles or the like, to prevent any of the sticky ingredients from adhering to the envelope. In this way, all of the proportioned ingredients are able to be dispensed from the envelope. There is no specific mention of a starch, and no teaching of heat-moisture treatment.

U.S. Pat. No. 4,089,988 to Mostyn, Verrall and Shrimpton, discloses a process for making a dried, granulated dessert-type food composition in which native starch particles and sugar particles are mixed and slightly moistened, then granulated. The granules are then dried, ground and screened to a smaller particle size. It is reported that such free flowing granulated particles will disperse instantly in hot liquid. There is no teaching of any heat-moisture treatment to the starch, nor is the reference specific with respect to the starch used.

U.S. Pat. No. 2,909,431 to Keller discloses a dry mix gravy-type food composition. The reference is specifically concerned with the problem of the lumping of starch when added to a hot liquid. The reference reports to overcome this problem by mixing native starch with a separating material, generally shortening, and some type of leavening ingredient. There is no teaching of heat-moisture treatment of the starch.

The term "heat-moisture-treated starch" is well known in the art, and is commonly used to refer to a starch which has been subjected to a heat treatment under controlled moisture conditions, the conditions being such that the starch undergoes neither gelatinization (i.e., exhibits substantially no loss of birefringence) nor dextrinization. Louis Sair, in *Methods in Carbohyrate Chemistry*, Vol. IV, R. J. Whistler Ed., Academic Press N.Y. (1964) pp. 283–285, describes laboratory-scale methods for heat-moisture-treated starches, and also describes various properties of starches so treated.

Heat moisture treatment of starches has been employed in food compositions in the past, but such employment has been for the purpose of utilizing the preferred texture and organoleptic properties of such starches rather than their retarded thickening. Thus, U.S. Pat. No. 3,578,497 to Hjermstad discloses the treatment of potato starch by either heating at a constant temperature just below the initial swelling temperature for a long period of time, or, alternatively, heating at a temperature just below the initial swelling temperature and gradually increasing the temperature above the initial heating temperature. Such starches have thickening temperatures as high as 180° F. and are reported to have better consistency characteristics in food uses than untreated potato starch. There is no disclosure of any delayed thickening, nor any indication that such property would allow the addition of a dry food product containing the starch directly to boiling water without lumping of the starch.

U.S. Pat. No. 4,013,799 to Smalligan, Kelly and Enad, discloses a similar heat-moisture treatment of tapioca starch for use in a wet, pre-cooked baby food formulation in order to increase the shelf life of the formulation. The only other starches suggested are grain starches; potato starch and other root starches are not mentioned. The product formulation is not dry, and there is nothing to indicate that the heat-moisture treatment is used to delay thickening.

As is known, heat-moisture-treatment affects various properties of all amylose-containing starches, but perhaps the most dramatic alteration takes place when root or tuber starches, particularly potato starch, are subjected to such a treatment. As has been reported in the literature, when measured as a function of time as with a Barbender Viscograph the "viscosity peak", i.e., the point of maximum viscosity increase during gelatinization, is delayed and also lowered. A starch whose viscosity peak has been delayed in this manner will be referred to throughout the instant specification and claims as a starch having "retarded thickening properties".

It should be noted that retarded thickening properties can be imparted to root starches by various means. One method is to heat an aqueous slurry of starch at just below its gelatinization temperature. This method requires very careful temperature control in order to avoid delatinization of the starch, and therefore it is less practical then the preferred method in which granular starch is treated at temperatures above the gelatinization range, under conditions of moisture and temperature which avoid gelatinization and dextrinization. A recently reported method is disclosed in U.S. Pat. No. 3,977,897 to Wurzburg which involves heating an aqueous slurry of starch at from 50° C. to 100° C., gelatinization being avoided by including in the slurry an appropriate amount of a suitable inorganic salt which raises the gelatinization temperature of the starch. Needless to say, starches so prepared must be thoroughly washed to remove the salts prior to using them in food products.

The most practical commercial method for preparing starches having retarded thickening properties for use in the instant invention is simply to heat starch, at its normal moisture content (or with some added moisture, if desired, but not in aqueous slurry) in a closed heating device, to give the desired degree of heat-moisture-treatment. Specific suitable conditions, and "guidelines" for selecting suitable conditions, will be presented hereinafter.

It should be apparent to those skilled in the art that while the food products of the present invention rely on the retarded thickening properties of the starches contained therein, such teaching may also be used in conjunction with the teachings of the prior art. It should be noted in this regard that the degree of retarded thickening necessary for adequate hot water dispersibility of the starch will also vary with the known effects of other ingredients in any particular food composition, such as fats, sugars, and the like.

Retarded-thickening properties can also be imparted to starch by means of chemical modification, but such methods are costly and may also employ chemicals which are undesirable or even prohibited in food. Because the instant invention relates solely to products intended for human consumption, these last-mentioned chemically-modified starches are generally not considered suitable for use in the invention.

OBJECTS OF THE INVENTION

It is an object of the present invention to provide a dry food product having a thickening component which food product can be prepared by direct addition of the product to boiling aqueous liquid.

It is a further object of the present invention to provide a dry food product having a thickening component and containing foodstuffs which require hydration, which food product can be prepared by the direct addition of the product to boiling aqueous liquid.

It is a still further object of the present invention to increase the hot water dispersibility of a dry food product having a thickening component by employing as said thickening component a modified starch having retarded thickening properties.

The other objects, features and advantages of the present invention will become more apparent in light of the following detailed description of the preferred embodiment thereof.

According to the present invention, there is disclosed a dry food product having a thickening component, said food product being prepared for reconstitution by direct addition to boiling aqueous liquid and which food product comprises, in part, a thickening component comprising a modified root starch or tuber starch having retarded thickening properties. A particularly preferred embodiment is such a food product wherein the modified starch is prepared by heating native potato starch having a moisture content from around 16% to 35% by weight, in a closed system at a temperature from 55° C. to about 135° C. for a sufficient time period to impart to the starch the characteristic of retarded thickening.

According to another embodiment of the present invention, there is disclosed a dry food product having a thickening component, said food product being prepared for reconstitution by direct addition to boiling aqueous liquid, and which comprises in combination a thickening component comprising a modified root starch or tuber starch having retarded thickening properties, which modified starch will not begin to thicken for at least five minutes after being introduced into boiling aqueous liquid, and at least one foodstuff which requires about 5 minutes cooking time in free aqueous liquid for adequate hydration. A particularly preferred embodiment is such a food product wherein the modified starch is prepared by heating native potato starch having a moisture content from around 16% to 35% by weight, in a closed system at a temperature from 55° C. to about 135° C. for a sufficient time period to impart to the starch the characteristic of retarded thickening.

According to a further embodiment of the present invention, there is disclosed a method for increasing the hot water dispersibility of a dry food product being prepared for a reconstitution by direct addition to boiling aqueous liquid, said method comprising the employment of a modified root starch or tuber starch having retarded thickening properties as said thickening component. A particularly preferred embodiment of this method employs a modified starch which is prepared by heating native potato starch having a moisture content from about 16% to 35% by weight, in a closed system at a temperature from 55° C. to about 135° C. for a sufficient time period to impart to the starch the characteristic of retarded thickening.

BRIEF DESCRIPTION OF THE DRAWING

The drawing shows the Brabender curves for untreated potato starch and starches prepared according to the teachings of the present invention.

DETAILED DESCRIPTION OF THE INVENTION

Specifically, the invention comprises a commercially prepared dry food product containing a thickening agent, which food product is prepared for ultimate consumption by adding it directly to boiling aqueous liquid and cooking it in same, wherein the thickening agent consists of a root starch or tuber starch having retarded-thickening properties. Most preferably the thickening agent consists of a heat-moisture-treated potato starch.

Typical examples of such food products include sauce or gravy bases, comprising starch plus flavoring and/or coloring materials, dry soup mixes containing dehydrated vegetables and/or meat plus a thickening agent and other food products which include at least one main ingredient which must be cooked in boiling water plus a sauce base, containing a starch thickening agent, which also must be cooked in boiling water. Examples of these last-mentioned food products are pasta or dumplings plus sauce.

Referring first to the sauce or gravy bases, it is well known that if one simply adds starch, or a base mix containing same, to a boiling liquid such as water or milk, the starch will rapidly form lumps which cannot be dispersed even with the most vigorous and extended stirring. This is because upon contact with the hot liquid the outer portion of the starch clusters immediately gelatinize, and this "coating" of gelatinized starch forms a barrier against further water penetration into the clusters. Many methods have been proposed to delay the hydration of starch until it has fully dispersed in the hot liquid, including adding to the starch-containing base mix a dispersing agent such as lactose or malto-dextrin, or coating the starch with fat. It has now been discovered that a potato starch with suitable retarded thickening properties, when added to boiling liquid with a slight amount of stirring, will disperse completely in the liquid prior to any actual thickening taking place. Therefore, a sauce or gravy base containing such a starch as the thickening agent can be reconstituted for consumption by merely adding it directly to boiling liquid and stirring gently for one or two minutes until the desired viscosity is reached, resulting in a smooth, lump-free, sauce or gravy.

In the area of products such as dumplings-plus-sauce combinations the use of a root starch having retarded-thickening as the thickening agent produces truly dramatic results, as will be seen in the Examples. Normally, such products are sold as "combination" packages, the dumplings being separate from the sauce base. To prepare the meal the consumer must boil the dumplings in water for the requisite period of time and prepare the sauce in a separate cooking utensil by cooking the base mix in water. One could not normally cook both the sauce and the dumplings simultaneously in the same kettle, because the sauce base, upon thickening, would immediately take up and "bind" a good portion of the water, leaving insufficient free water to cook completely the dumplings. However, to prepare such a product which has been made in accordance with the invention the consumer can merely add all of the ingredients, the dumplings and the sauce base, directly to a single kettle of boiling water and permit it to cook for the requisite period of time. During the first stage of cooking no substantial thickening of the sauce takes place, thereby leaving all of the water free to hydrate and cook completely the dumpling. Then, during the last few minutes of the cooking time the sauce thickens, after which the complete meal is ready to be served and eaten.

By applying appropriate conditions of heat-moisture-treatment potato starches of different gelatinization characteristics (e.g., time required for commencement of thickening and extent of ultimate thickening) can be prepared; therefore such starches can be "tailor-made" to meet the requirements for any specific food product application. Following are some general principles regarding heat-moisture-treating of potato starch (as well as other root starches).

(1) The moisture present can be as low as about 16% and should not exceed 35% by weight. Frequently, potato starch at its "normal" moisture level at ambient temperature and relative humidity, i.e., 18-21% moisture, can be employed without any additional water being added.

(2) The temperature can be as low as 55° C., and should not exceed about 135° C.; excessive temperatures result in secondary changes, e.g., dextrinization. Temperatures within the range of 90°-120° C. are suitable for most degrees of modification.

(3) The time of treatment will depend upon the desired degree of modification and also, of course, upon the equipment used, which equipment used will define, of course, the quantity of starch being treated and the time at which the starch itself reaches treatment temperature.

(4) Other conditions being equal, the extent of the modification of the starch (i.e., delay in reaching viscosity peak and lowering of the ultimate viscosity) is increased with increases in any of the three variables of water content, temperature and time.

(5) Because gelatinization of the starch (including any substantial loss of birefringence) must be avoided, relatively low temperatures must be employed at high moisture levels, while high temperatures (up to about 135° C.) may be used at lower moisture levels.

(6) Uniform heating of the starch is necessary to ensure an even, homogeneous treatment. Simultaneous mixing and heat processing, as in the case of a rotating mixer, is therefore preferred. Occasionally, this may lead to problems of starch aggregation including the formation of firm starch clusters. Problems of this kind can typically be avoided by the addition of a surface active agent, such as glycerol monostearate, as a technical aid to prevent this occurring. An amount of 0.1% based on the starch dry weight has been shown to be sufficient for such purposes in the case of potato starch.

EXAMPLES

Following are descriptions of two specific heat-moisture-treatments to produce starches having desirable properties for different food applications. The equipment used was a laboratory-scale, slowly rotating jacketed cylindrical autoclave which rotates in the horizontal axis. The outlet of the autoclave was insulated to prevent localized temperature differences which would cause condensation and partial gelatinization of the starch. The volume of the cylinder was 9 liters, and the heating medium used in the jacket was glycerine. The autoclave was hermetically sealed during treatment.

In each case the autoclave was brought to the desired temperature, 3 kg. of native potato starch, containing 19.2% moisture content was introduced into the autoclave together with 0.1% glycerol monostearate (on a starch dry weight basis) as a technical aid to prevent aggregation of the starch during treatment. The autoclave was sealed and the starch treated for the requisite period of time. The starch was then removed from the autoclave and spread out in a thin layer at room temperature to facilitate cooling and drying. After reaching room temperature the starch, which had a moisture content of about 15%, was sieved. Before use in the Examples, all of which exemplify dry food mixes, the starch was dried to a moisture content of about 8%.

The first starch, designated as STARCH A, was treated to render it suitable for use as a thickening agent for a sauce or gravy base. For such products extensive modification is neither necessary nor desirable; the gelatinized time need not be delayed for more than a few seconds (just long enough to permit the starch, in the presence of the other ingredients, to become fully dispersed in the boiling liquid), while a fairly high final viscosity is required. Therefore, this starch was subjected to relatively mild treatment conditions, specifically, a temperature of 103° C. for a period of 115 minutes.

The second starch, designated as STARCH B, was prepared for use as a thickening agent in soup mixes or sauce mixes which were to be used in conjunction with other dried food products requiring relatively long cooking time. For such products one needs a starch, the thickening of which is delayed for several minutes, i.e., sufficient time to permit the other ingredients to become fully cooked. For starch B the treatment conditions selected were 100° C. for 195 minutes.

The drawing gives the Brabender curves for the untreated potato starch and starches A and B.

Starches A and B were then employed as thickening agents in various dried food product formulations, as set forth in the following examples. The examples are presented for illustrative purposes only and the skilled practitioner will readily be able to select optimum starches and recipe formulations for a wide variety of food products.

EXAMPLE I, BROWN GRAVY MIX

| | Recipe I(a) (Invention) | |
| --- | --- | --- |
| Ingredient | Amt. (gms) | Percentage |
| STARCH A | 259 | 46.25 |
| Malto-dextrin | 51 | 9.11 |
| Rice Flour | 18 | 3.21 |
| Lactose | 70 | 12.05 |
| Flavorings & Colorings | 138 | 24.64 |
| Sunflower Oil | 24 | 4.29 |
| TOTAL | 560 | 100.00 |

Recipe I(b) (Comparison)

This was identical to Recipe I(a) except the STARCH A was replaced by 259 gms. native (untreated) potato starch.

Recipe I(c) (Comparison)

This was identical with Recipe I(a) except STARCH A was replaced by 373 gms. of wheat flour. In this example, and in other examples wherein the wheat flour is employed for comparative purposes, the amounts of wheat flour are adjusted so as to give a product having the same final viscosity as the product prepared in accordance with the invention, when both products are reconstituted for consumption under identical conditions, by adding the product to cold aqueous liquid and then heating to effect the gelatinization and thickening.

Reconstitution of the Base Mix for Consumption

In each case 250 ml. water was brought to boiling and the base mix (15 gm. each of recipes I(a) and I(b), and 18 gm. of recipe I(c) were added directly to the boiling water with stirring. The products were then simmered with occasional stirring for about one and one-half minutes. The products were then removed from the heat and poured through household strainers into bowls.

Observations and Results

Recipes I(b) and I(c) thickened immediately upon being introduced into the boiling water, with the formation of large lumps which did not disperse during the simmering period, even with stirring. I(a) showed no thickening upon being introduced into the water, but gradually began to thicken about 5–10 seconds later, and had fully gelatinized and thickened by the end of the cooking time of one and one-half minutes. Gravy I(a) contained no lumps whatsoever, and had an excellent, smooth, short texture. Gravy I(b) contained a number of lumps, which were restrained by the strainer, and the texture of the strained gravy was glutinous and stringy, although relatively smooth (the lumps having been all retained on the strainer.) Gravy I(c) contained a great many lumps of various sizes, the large ones being retained by the strainer, the smaller ones passing through thereby rendering the strained gravy lumpy as well. Furthermore, the strained gravy was substantially less thick than gravies I(a) and I(b), and had a decidedly watery texture.

EXAMPLE II, VANILLA CUSTARD SAUCE

Recipe II(a) illustrating the invention, was prepared by mixing together 170 gms. of STARCH A, 120 gms. of fine crystal sugar, 120 gms. powdered sugar and 6.3 gms. of flavorings and colorings. Recipe II(b) was also prepared for comparative purposes, consisting of a mixture of 160 gms. of maize starch, 120 gms. fine crystal sugar, 120 gms. powdered sugar and 6.2 gms. of flavoring and coloring. As was the case with the wheat starch in Example I, the respective amounts of STARCH A and maize starch were adjusted to give products of identical final viscosity when prepared in conventional manner, i.e., adding to cold milk and then cooking.

The two sauce mixes were then prepared for consumption by bringing 250 ml. of milk to boiling, stirring 20 gms. of each mix directly into the boiling milk, and simmering, with occasional stirring, for one and one-half minutes. The finished sauces were then strained into bowls, as in Example I.

Observations and Results

Sauce mix II(b) thickened immediately upon being introduced into the boiling milk, and formed large lumps which could not be dispersed with stirring. Sauce mix II(a) showed no noticeable thickening for the first few seconds, and then gradually thickened to a smooth lump-free sauce.

Sauce II(a) passed through the strainer without leaving any residue other than a few small particles of burned milk, and the strained custard had an excellent smooth thick texture. When Sauce II(b) was strained into the bowl the large lumps of starch were retained on the strainer and the strained sauce contained small lumps and "fish-eyes". The strained sauce was substantially less thick than sauce II(a) and did not have a smooth homogenous texture.

EXAMPLE III, WHITE SAUCE WITH VEGETABLES

Dehydrated vegetables normally require several minutes cooking time in boiling water for complete dehydration. Therefore, packaged products containing such dehydrated vegetables plus a dry sauce base normally contain separate packets, or pouches, of the ingredients, and the consumer must cook the sauce base and the dried vegetables in separate cooking utensils. This example shows such a product wherein all of the ingredients may be packaged together and cooked for ultimate consumption in a single step and in a single cooking utensil.

| Recipe III(a) (Invention) White Sauce Base | |
|---|---|
| Ingredient | Amt. (gms.) |
| STARCH B | 180 |
| Hydrolyzed veg. protein | 10 |
| Fat powder (dried veg. fat emulsion | 110 |
| Sodium Phosphate | 10 |
| Salt | 50 |
| Onion Powder | 10 |
| MSG | 32 |
| Sugar | 8 |
| Citric Acid | 2 |
| TOTAL | 412 |

To 40 gms. of the white sauce mix was added 4 gms. each of the following dehydrated (air-dried) vegetables; the average dimensions of the dehydrated vegetables, in centimeters, are given in parenthesis: leek (3.9X2.0X0.1), celery (2.5X0.4X0.4), green beans (3.0X0.7X0.7). The aforementioned dehydrated vegetables normally require a cooking time, in boiling water, of about twenty minutes for complete rehydration.

Recipe III(b) (Comparison)

This was identical to Recipe III(a) except STARCH B was replaced with 180 gms of native potato starch.

Recipe III(c) (Comparison)

This was identical with Recipe III(a) 200 gms. of wheat flour was used in place of the STARCH B, and 44 gms. of the base mix was combined with the 12 gms. dehydrated vegetables.

Preparation for Consumption

In each case 700 ml. of water was brought to a boil and the sauce-plus-vegetables mix (52 gms. each of Recipe III(a) and III(b), 56 gms. of Recipe III(c) was stirred directly into the boiling water, after which the cooking pans were partially covered and the product allowed to simmer for 25 minutes. The products were stirred occasionally during the cooking time. At the end of the cooking time the products were poured into bowls.

Observations and Results

Recipe III(a) did not thicken at all upon being added to the boiling water, and no observable thickening whatsoever took place during the first 5 minutes of the cooking time. After about 5 minutes a very slight thickening could be observed, which increased very slowly, the liquid still being thin after 10 minutes cooking time. The thickening progressed gradually during the last 15 minutes of cooking time until a smooth thick product resulted.

Both mixes III(b) and III(c) thickened, and formed lumps, immediately upon being introduced into the boiling water. These finished products, i.e., after the full cooking time, both retained lumps, sauce III(b) containing more lumps than sauce III(c).

Finished sauce III(a) had an excellent, smooth, thick, "short" texture. Sauce III(b) also had a thick, but a "long" texture, in addition to containing a large number of lumps. Sauce III(c) was substantially thinner than III(a) and III(b), and had a somewhat "slimy" texture.

Upon tasting the finished products it was noted that the vegetables in III(a) were all fully rehydrated and cooked, while those of sauce III(b) were definitely less tender, indicating incomplete rehydration. The vegetables in sauce III(c) were also not fully rehydrated, but were somewhat more tender than those of III(b).

In addition, taste differences were observed which could not be attributed solely to the differences in the textures of the sauces and degrees of rehydration of the vegetables. The flavor of product III(a) was substantially better than that of either of the other two products, indicating that the free water available for the cooking of sauce III(a) acted not merely to rehydrate fully the dehydrated vegetables but also to release their flavor as well as the flavorings of the seasonings employed in the mix.

EXAMPLE IV, LENTIL BROTH

Thick "chunky" soups and broths, containing large pieces of vegetables and/or meat in a thick base, are extremely popular food products, but the manufacture of dry mixes for such products, and the ultimate preparation of same for consumption, present problems because the dry "chunky" portions need to be rehydrated in free water. Following is a recipe for such dry product which can be packaged in a single package and prepared for consumption in a single cooking utensil.

| Recipe IV(a) (Invention) | |
|---|---|
| Ingredient | Amt. (gms.) |
| (1) Base Mix | |
| STARCH B | 108.0 |
| Lactose | 85.0 |
| Lentil Flour | 220.0 |
| Streaky Bacon | 135.0 |
| Flavorings (including yeast powder, tomato powder, onion flour, salt & spices), flavor enhancers & colorings | 346.0 |
| TOTAL | 894.0 |

| (2) Vegetable Mix (average dimensions in mm. shown in parenthesis). | |
|---|---|
| Quick-cooking lentils | 270 |
| Air-dried potato | 15 (16 × 16 × 2) |
| Air-dried carrots | 6 (10 × 10 × 1) |
| Dried grated onions | 4 |
| Air-dried leek | 1 (15 × 15 × 1) |
| Beef fat | 4 |
| TOTAL | 300 |

For a single portion 33 gms. base mix were combined with 90 gms. of the vegetable mix.

Recipe IV(b) (Comparison)

The base mix was identical to the base mix of Recipe IV(a) except that, as the thickening agent, STARCH B was replaced with 75 gms. of wheat flour and 21 gms. of guar gum. The vegetable mix was identical to that used in Recipe IV(a), and, as in Recipe IV(a), a unit portion was made up by mixing together 33 gms. of base mix with 90 gms. of vegetable mix.

Preparation for Consumption 500 ml. of water was brought to a boil and the dry mixes (123 gms. each) were stirred directly into the boiling water. Each kettle was then partially covered and the product allowed to simmer for 10 minutes, with occasional stirring (the vegetable mix itself would normally require a cooking time in boiling water of about 8 minutes for full rehydration). At the end of the cooking time both products were poured into bowls.

Observations and Results

During the first 5 minutes of cooking time Recipe IV(a) remained substantially thinner than Recipe IV(b), after which it gradually became thicker during the last 5 minutes of cooking. After the product had been poured into bowls it was observed that the kettle in which Recipe IV(b) had been cooked still contained a fair amount of "burned-on" product. No "burning-on" occurred during the cooking of Recipe IV(a).

Both finished products were very similar in appearance, i.e., both being very thick broths. Substantial differences, on the other hand, were detected upon tasting the two products. In the case of broth IV(a) the lentils and other vegetables were extremely tender and were fully cooked and rehydrated; the vegetables in broth IV(b) were not fully rehydrated and therefore were substantially less tender. Furthermore, the overall flavor of broth IV(a) was substantially better than that of broth IV(b), again indicating that the free water available during the major portion of the cooking time had effectively released the flavors of the vegetables and other ingredients of the total mix.

EXAMPLE V, DUMPLINGS WITH SAUCE

Dry dumplings, having an average diameter of one and one-half cm. and containing protein, cereals, flavorings and fats, which dumplings are normally cooked by adding them to boiling water and simmering for about 8 minutes, were combined with a tomato base having the following composition.

| Ingredient | Amt. (gms.) |
| --- | --- |
| Tomato powder | 400 |
| STARCH B | 192 |
| Salt | 76 |
| Sugar | 72 |
| Fat | 160 |
| MSG | 42.4 |
| Fat powder | 56 |
| Spices, flavorings colorings | 83.6 |
| TOTAL | 1082.0 |

49 gms. of the sauce mix was mixed with 45 gms. of the dumplings, and added directly to 400 ml. of boiling water. The pan was partially covered and the product was simmered for 10 minutes. No noticeable thickening of the sauce occurred during the first 5 minutes of the cooking time; then a slight thickening began, and the thickening gradually continued for the last half of the cooking period until, at the end of the 10 minutes, the sauce was thick and very smooth. The finished product had an excellent appearance and taste, the dumplings being completely cooked and hydrated.

For comparative purposes a similar mix was prepared by combining the dumplings with a commercially available "instant" tomato sauce base having, as the thickening system, native potato starch, guar gum and flour. The commercial mix also contained lactose as a diluent to impart to the mix its "instant" character. The combination of dumplings and commercial sauce base was added directly to boiling water. After the 10 minute cooking time the dumplings were decidedly "under cooked" and insufficiently hydrated. The product was then subjected to an additional 5 minutes cooking time, during which time a substantial amount of the product burned-on the bottom of the kettle. In spite of the additional 5 minutes cooking time the dumplings were still under cooked and not fully hydrated.

EXAMPLES ILLUSTRATING STARCHES OTHER THAN POTATO

The invention can be practiced, as has been stated, with any root starch or tuber starch having retarded-thickening properties (such retarded-thickening properties advantageously being imparted by a heat-moisture treatment); Examples I-V illustrate practice of the invention employing the preferred starch, which is potato starch. It should be noted, however, that potato starch is preferred merely because it is generally more readily available and less expensive than other operable starches. Examples VI and VII, to follow, illustrate the applicability of other starches as well.

Tapioca and arrowroot starches were selected for the additional examples, and three different heat-moisture treatments, all using the same equipment, and the same general process, as STARCHES A and B described previously. The specific treatments, all designed to produce starches suitable for use in gravy or sauce mixes, were as follows.

STARCH C was prepared from tapioca starch having an original (normal) moisture content of 13.8%. The moisture content was raised to 22.7% by spraying water from a fine nozzle onto the starch while mixing it. A 2.5 kg. quantity of the starch was then placed in the autoclave together with 0.5% glycerol monostearate (on a starch dry weight basis) as a technical aid to prevent aggregation of the starch during treatment. The autoclave was then sealed and the starch was treated for 3 hours at 100° C. The treated starch was cooled and sieved as with STARCHES A and B. The moisture content of the cooled starch was about 18%. As was the case with STARCHES A and B, STARCH C (as well as STARCHES D and E, to be described) was dried to about 8% moisture before use in a food mix.

STARCH D was prepared from arrowroot starch having an original moisture content of 13.7%, which moisture content was raised to 24.2% before treatment. A 2.5 kg. quantity of the starch together with 0.5% glycerol monostearate (d.w.b.) as a technical aid, were introduced into the autoclave and treated for 50 minutes at 95° C. After cooling the moisture content was about 19%.

STARCH E was also prepared from arrowroot starch, all conditions being identical to those of STARCH D except the time of treatment was 70 minutes instead of 50 minutes.

EXAMPLE VI, BROWN GRAVY MIX, TAPIOCA STARCH

A mix very similar to that of Example I was prepared, using STARCH C as the thickening agent; for comparison purposes a second mix employing untreated, native tapioca starch was prepared. The following table sets forth the compositions of the mixes.

| | Amounts in Grams | |
| --- | --- | --- |
| Ingredient | Invention | Comparison Example |
| STARCH C | 301 | |
| Native tapioca starch | | 301 |
| Maltodextrin | 51 | 51 |
| Rice flour | 18 | 18 |
| Lactose | 70 | 70 |
| Flavorings & colorings | 138 | 138 |

| | Amounts in Grams | |
|---|---|---|
| Ingredient | Invention | Comparison Example |
| Sunflower oil | 24 | 24 |

Gravies were prepared from the mixes exactly as in Example I except 16 gms. of each mix were added to the 200 ml. boiling water.

The observations and results were virtually identical to those in Example I. The mix containing the native tapioca starch thickened immediately and formed large lumps; the final gravy was similar to Recipe I(b). The mix containing the treated starch behaved as did Recipe I(a), resulting in a smooth, shorttextured gravy.

EXAMPLE VII, BROWN GRAVY MIX, ARROWROOT STARCH

Brown gravy mixes employing STARCH D and, for comparison purposes, untreated arrowroot starch, were prepared. The recipes were identical to those of Example VI except 339 grams of each starch instead of 301 grams were used.

Preparation of the gravies was the same as in Example VI except 17 grams of each mix was added to the boiling water.

The observations and results were the same as in Example VI.

EXAMPLES VIII, VANILLA CUSTARD SAUCE, ARROWROOT STARCH

Mixes similar to those of Example II were prepared, using STARCH E and, for comparative purposes, untreated arrowroot starch. The exact composition of the mixes are set forth below.

| | Amounts in Grams | |
|---|---|---|
| Ingredient | Invention | Comparative Example |
| STARCH E | 250 | |
| Native arrowroot starch | | 160 |
| Fine crystal sugar | 240 | 240 |
| Flavorings & colorings | 6.3 | 6.3 |

Sauces were prepared with boiling milk (250 ml.) as in Example II; 25 grams of the mix containing STARCH E and 20 grams of the mix containing the native starch being used.

The observations and results were very similar to those of Example II, the mix prepared in accordance with the invention forming an excellent, smooth, lump-free, short-textured sauce, the mix containing untreated arrowroot starch behaving very much like Recipe II(b).

The term "arrowroot starch", as used above, means starch from the species Maranta arundinacea; the term "tapioca starch", as used above, referes to native starch from the Cassava root (Manihot utilissima).

What is claimed is:

1. A prepared, dry food product having a thickening component, said food product being intended for reconstitution by direct addition to boiling aqueous liquid and which in part comprises
   a thickening component comprising a modified root starch or tuber starch having retarded thickening properties
   wherein said modified starch is prepared by
   (a) heating native starch having a moisture content from about 16% to 35% by weight, in a closed system at a temperature from 55° C. to about 135° C. for a sufficient time period to impart to the starch the characteristic of retarded thickening,
   (b) cooling and drying the starch prepared in step (a).

2. The food product of claim 1 wherein the modified starch is potato starch.

3. The food product of claim 2 wherein said modified starch is prepared by heating native potato starch, having a moisture content 18%-21% by weight, in a closed system at a temperature within the range of 90° C. and 120° C., for a sufficient time period to impart to the starch the characteristic of retarded thickening.

4. The food product of claim 3 wherein the modified starch is one which will not begin to thicken for at least five seconds after being introduced into boiling aqueous liquid.

5. The food product of claim 3 wherein the modified starch is one which will not begin to thicken for at least five minutes after being introduced into boiling aqueous liquid.

6. A dry food product having a thickening component, said food product being prepared for reconstitution by direct addition to boiling aqueous liquid, and which comprises in combination
   a thickening component comprising a modified root starch or tuber starch having retarded thickening properties, which modified starch will not begin to thicken for at least five minutes after being introduced into boiling aqueous liquid, and
   at least one foodstuff which requires about 5 minutes cooking time in free aqueous liquid for adequate hydration, wherein said modified starch is prepared by heating native starch having a moisture content from about 16% to 35% by weight, in a closed system at a temperature from 55° C. to about 135° C. for a sufficient time period to impart to the starch the characteristic of retarded thickening.

7. The food product of claim 6 wherein said modified starch is potato starch.

8. A method for increasing the hot water dispersibility of a dry food product having a thickening component, said food product being prepared for reconstitution by direct addition to boiling aqueous liquid, said method comprises the employment of a modified root starch or tuber starch having retarded thickening properties as said thickening component, wherein said modified starch is prepared by heating native starch having a moisture content from about 16% to 35% by weight, in a closed system at a temperature from 55° C. to about 135° C. for a sufficient time period to impart to the starch the characteristic of retarded thickening.

9. The method of claim 8 wherein said modified starch is potato starch.

* * * * *